United States Patent

[11] 3,597,068

| [72] | Inventors | Kazuo Masuyama<br>Nishimiya-shi, Hyogo;<br>Saichiro Ohashi, Nishimiya-shi, both of, Japan |
|---|---|---|
| [21] | Appl. No. | 834,256 |
| [22] | Filed | June 18, 1969 |
| [45] | Patented | Aug. 3, 1971 |
| [73] | Assignee | Fuji Photo Film Co., Ltd.<br>Kamigun, Kanagawa, Japan |
| [32] | Priority | July 27, 1968 |
| [33] | | Japan |
| [31] | | 43/53,099 |

[54] CINEMATOGRAPHIC CAMERA
1 Claim, 4 Drawing Figs.

[52] U.S. Cl.................................................. 352/243,
95/86
[51] Int. Cl.................................................. G03b 17/00

[50] Field of Search.......................................... 352/242,
243; 95/86; 248/11, 183

[56] References Cited
UNITED STATES PATENTS

| 2,928,315 | 3/1960 | Broido........................ | 95/86 X |
| 3,230,850 | 1/1966 | Campbell.................... | 352/243 X |
| 3,240,143 | 3/1966 | Koeber, Jr. et al............ | 352/243 X |
| 3,242,840 | 3/1966 | Kremp et al. ................ | 352/243 X |
| 3,380,366 | 4/1968 | Olson ......................... | 352/243 X |

Primary Examiner—Louis R. Prince
Assistant Examiner—Joseph W. Roskos
Attorney—Sughrue, Rothwell, Mion, Zinn and Macpeak ABSTRACT: A grip for a movie camera serves as a lens cover by being rotated 180° about its pivot axis in front of the front face of the camera, with the motor serving as the pivot for rotation of the grip mounted at the front of the camera body.

CINEMATOGRAPHIC CAMERA

BACKGROUND OF THE INVENTION

The present invention relates to a cinematographic camera and in particular to a cinematographic camera in which the grip is used as a lens cover and the transmission gear mechanism is of simplified construction.

In compact size movie cameras having a driving motor therein, the motor is contained in the hand grip together with an energizing cell in order to make the whole system compact. The power drive is transmitted to the shutter and the film feeding mechanism through a transmission gear mechanism. Since the driving motor is disposed in the vertical position and the shutter and the film takeup shaft are positioned horizontally, a complex structure of transmission gears is required.

Further, in the conventional movie camera described above, the hand grip is fixed to the camera body and depends or projects therefrom. Therefore, the projected grip becomes an obstacle when the camera is put into a carrying bag or the like.

SUMMARY OF THE INVENTION

In accordance with the present invention, the grip is pivotally mounted on the camera body so that the grip can be selectively positioned in either the closed or picture-taking position. The driving motor is positioned at the pivot of the rotatable grip and the shutter button is provided on the grip of the camera. The shutter mechanism is located in the camera body so that the shutter button is brought into alignment with the shutter release lever in the camera body only when the grip is positioned in the picture-taking position.

Since the driving motor is used as a pivot for rotation of the grip in the movie camera in accordance with the present invention, the camera as a whole can be made in a compact size. In addition, the transmission gear for transmitting the driving power to the shutter and film feeding mechanism may be greatly simplified.

Since the grip is made to rotate and selectively set to either a closed position or a picture-taking position, it is very easy to carry and handle the camera when it is not in use and the grip can be used as a lens cover for protecting the view finder, taking lens, photocell and the like provided on the front face of the camera body thus extending the life of the photocell and other components.

An additional advantage of the movie camera in accordance with the present invention is that, since the shutter button is brought into alignment with the shutter release lever in the camera body only when the grip is positioned in the picture-taking position, no conventional shutter safety or lock device is required. Owing to this shutter button construction, the preparation for taking movies can be made quickly and without error.

A principal object of the present invention is to provide a cinematographic camera which has a rotatable grip pivotally mounted to the camera body selectively set to either the closed position or the taking position.

Another object of the present invention is to provide a cinematographic camera wherein the driving motor is positioned at the pivot of the rotatable grip of the camera.

Still another object of the present invention is to provide a cinematographic camera wherein the shutter button is provided in the camera body so that the shutter button is brought into alignment with the shutter release lever in the camera body only when the grip is positioned in the picture-taking position.

Still another object of the present invention is to provide a cinematographic camera which has a rotatable grip serving as a lens cover when positioned in the closed position.

DESCRIPTION OF THE PREFERRED EMBODIMENTS

Figure 1:
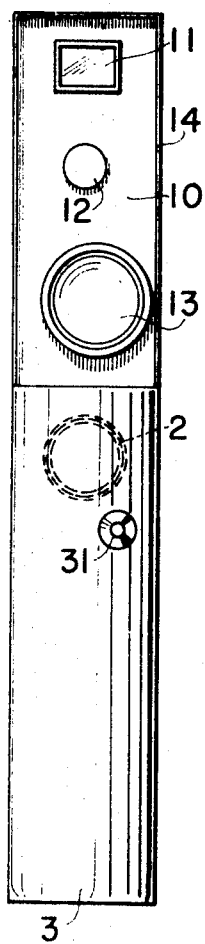
FIG. 1 is a front view of the movie camera in accordance with the present invention wherein the grip of the camera is positioned in the picture-taking position.
Figure 2:
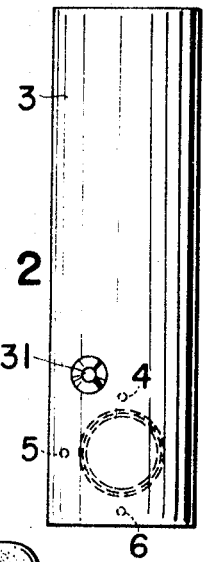
FIG. 2 is a front view of the movie camera in accordance with the present invention wherein the grip of the camera is positioned in the closed position.
Figure 3:
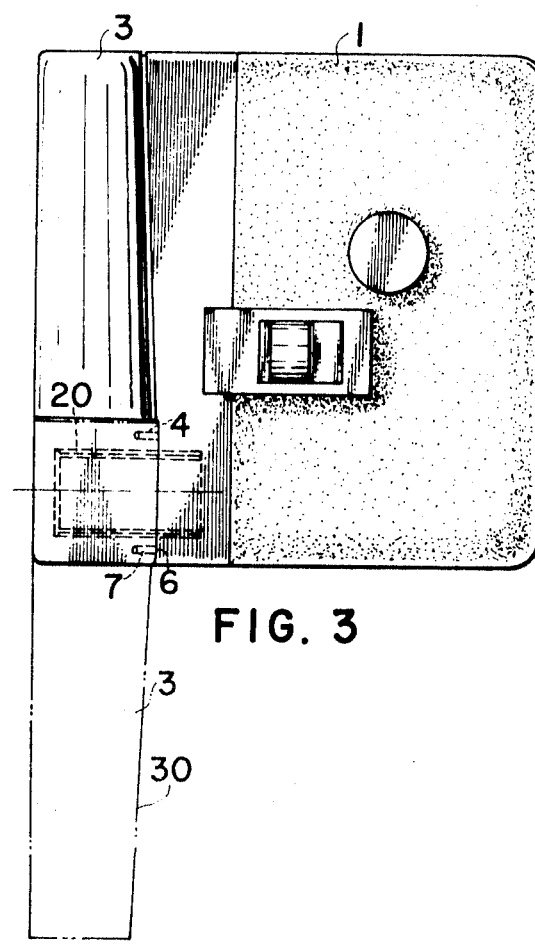
FIG. 3 is a side view of the movie camera shown in FIG. 2.

Now referring to FIGS. 1 through 3, the camera body 1 has substantially rectangular side faces and a front face 10 containing a view finder aperture 11, photocell 12 of the exposure meter which includes an automatic exposure controlling device, and an objective lens 13. A part of the driving motor 2 projects out from the front face 10 at the lower portion thereof. The driving motor is cylindrical in shape and the axis thereof is perpendicular to the front face 10 of the camera body 1 with the driving motor 2 as a pivot. The grip 3 has the same length as the height of the camera body 1 and the same width as that of the camera body 1, so that the upper and lower end of the grip 3 is aligned with the upper and lower end of the camera body 1 when the grip 3 is positioned in the closed position in front of the camera body as shown in FIGS. 2 and 3. The back face 30 of the grip 3 is adapted to cover the front face 10 of the camera body 1 when the grip 3 is positioned in the closed position and when the grip 3 is in the extended position, it can be gripped for taking movies.

A cylindrical pivot 20 is fixed around the driving motor 2 and the grip 3 is rotated around the pivot 20. A proper positioning device is provided on the grip and the camera body for selectively positioning the grip in the closed position and the picture-taking position. In the embodiment shown in the drawing, a pin 7, for determining the position of the grip, is disposed on the camera body 1. Holes 4, 5, 6 for determining the position of the grip are provided on the grip 3, whereby the grip 3 is held in the closed position and the picture-taking position by engagement of the pins in the holes. That is, the grip 3 is urged toward the camera body by means of a spring and the engagement of the pin 7 and the holes 4, 5, and 6 is released by pulling the grip away from the camera body and then rotating the grip about the pivot. When the pin 7 is engaged with the hole 6, the grip is in the closed position. When the pin 7 is brought into engagement with the hole 5, the grip 3 is held in its horizontal position. When the grip 3 is to be positioned in the picture-taking position, the pin 7 is brought into engagement with the hole 4.

The horizontal position of the grip 3 is utilized when the camera is placed on the ground or a plate for taking movies therefrom. The grip 3 supports the camera body 1 in this position.

By providing a rib 14 on the marginal portion of the front face 10 of the camera body 1 and making the ridge of the back face 30 of the grip 3 rounded, the grip 3 can engage the front face 10 of the camera body 1 and thereby protect the front face of the camera body.

Figure 4:
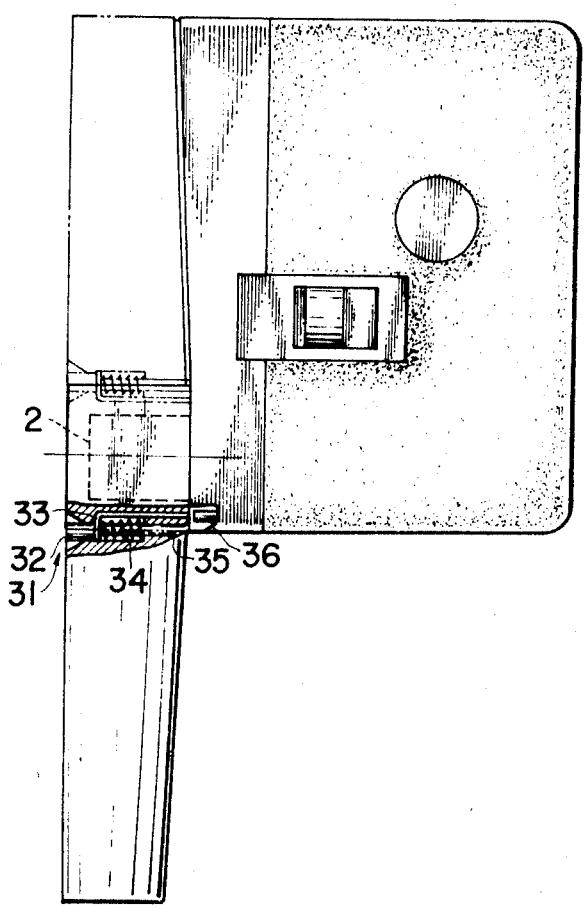
FIG. 4 is a side view partly in section of the movie camera in accordance with the present invention showing the shutter button construction in relation to the shutter release lever in the camera body.

By constructing the movie camera in accordance with the present invention, locking of the shutter button 31 can be easily conducted. As shown in FIGS. 1, 2 and 4, the shutter button 31 is located at a position other than on the axis of rotation of the grip 3 so that the relative position of the shutter button 31 to the camera body 1 varies according to the rotation of the grip 3. The shutter release pin 36 connected to the shutter mechanism in the camera body 1 is located on the camera body at the position where the shutter release pin 36 is brought into alignment and association with the shutter button 31 only when the camera grip 3 is brought into the picture-taking position. In the case where the shutter button 31 is required to be pushed and the shutter is required to be operated when the grip 3 is in the horizontal position, the shutter release pin construction is so made that the pin 36 can be associated with the shutter button when the grip 3 is in the horizontal position. Thus, the shutter is operated only when the grip 3 is brought into the position for taking pictures, that is, the shutter is locked when the grip is in the position for taking pictures. In the embodiment of the camera shown in FIG. 4, a bent portion 33 is brought into alignment with the shutter release pin 36 in the camera body 1. The pushbutton portion 32 is adapted to be pushed inward into the grip 3 along the guide shaft 35 against the power of the spring 34. Therefore, only when the end of the bent portion 33 is in alignment with the pin 36 can the shutter button 31 be pushed in, and in all other cases the shutter button 31 cannot be actuated.

The invention and its attendant advantages will be understood from the foregoing description. It will be apparent that various changes may be made in the form, construction and arrangement of the parts of the invention without departing from the spirit and scope thereof. We do not wish to be restricted to the specific form shown or uses mentioned except as defined in the accompanying claims, wherein various portions have been separated for clarity of reading and not for emphasis.

What we claim is:

1. In a camera having a view finder, photocell and a picture-taking lens on the front face of the camera, said camera further comprising:
    a. a driving motor having a portion thereof projecting out from the lower part of the front face of said camera, and
    b. a grip secured to said camera and rotatably mounted on said projecting portion, said grip being adapted to be set in at least two positions selectively, said two positions being a closed position wherein said grip covers said lens and a picture-taking position wherein said grip exposes said lens, view finder, and photocell.